Dec. 22, 1931.   J. L. BOSCH   1,837,946
MUD SCRAPER
Filed July 16, 1930   2 Sheets-Sheet 1

J. L. Bosch, INVENTOR
BY Victor J. Evans
ATTORNEY

Dec. 22, 1931.   J. L. BOSCH   1,837,946
MUD SCRAPER
Filed July 16, 1930    2 Sheets-Sheet 2
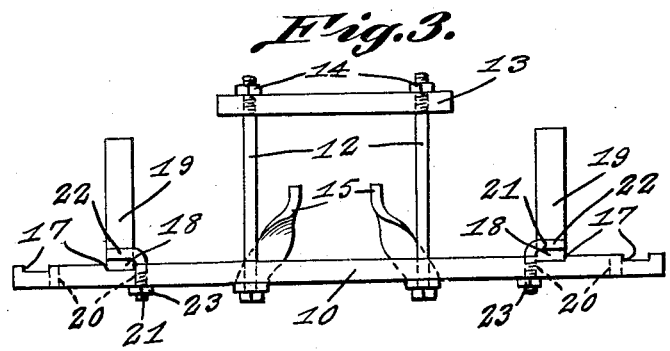
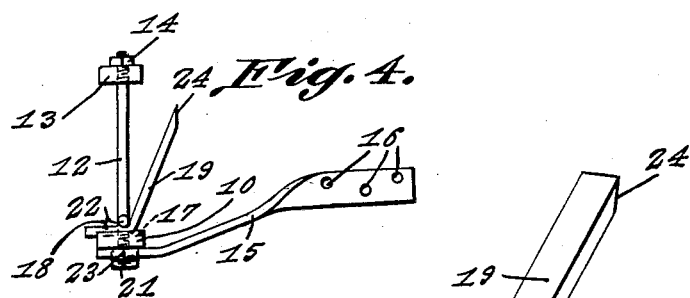
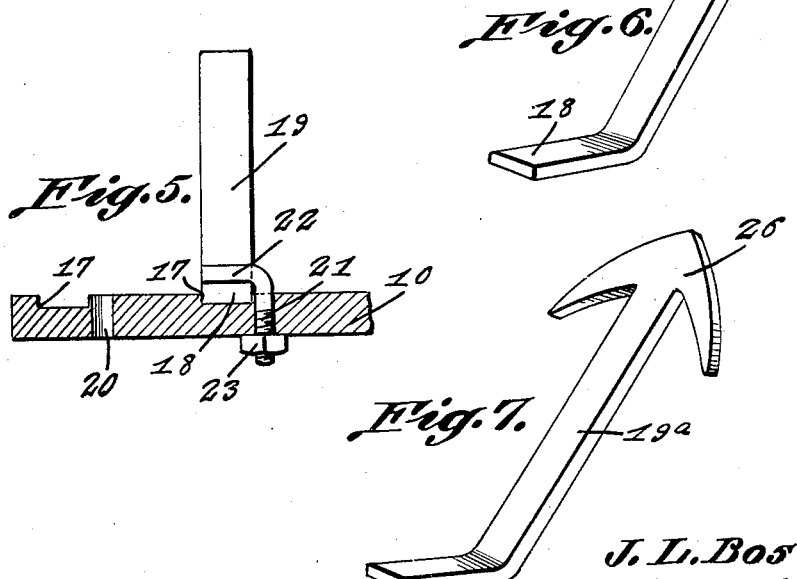
J. L. Bosch, INVENTOR
BY Victor J. Evans
ATTORNEY Patented Dec. 22, 1931

1,837,946

UNITED STATES PATENT OFFICE

JOSEPH L. BOSCH, OF DEVILS LAKE, NORTH DAKOTA

MUD SCRAPER

Application filed July 16, 1930. Serial No. 468,359.

This invention relates to scrapers for removing mud and the like from the wheels of vehicles, and is especially designed for use upon tractors.

An object of the invention is the provision of means for removably attaching the scrapers in position, the said means including a scraper bar and means for detachably securing the bar to the body or frame of the vehicle, together with means to brace the bar so that the latter will be rigidly held in position.

Another object of the invention is the provision of means for detachably securing scraper blades to the bar, whereby the latter may be accurately adjusted to the diameter of the wheels, and laterally adjusted for use with different types of wheels and different wheel gages.

With the above and other objects in view, the invention further includes the following novel features and details of construction, to be hereinafter more fully described, illustrated in the accompanying drawings and pointed out in the appended claim.

In the drawings:—

Figure 3 is a front elevation of the invention per se.

Figure 4 is a side view of the same.

Figure 5 is an enlarged fragmentary sectional view on the line 5—5 of Figure 2.

Figure 6 is a detail perspective view of one of the scraper blades.

Figure 7 is a similar view of a slightly different form of blade.

Figure 1:
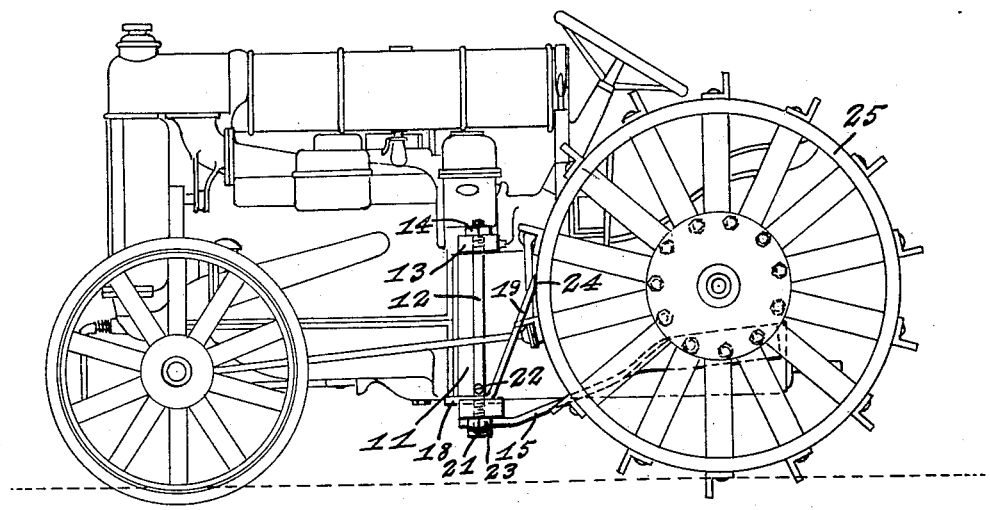
Figure 1 is a side elevation of a tractor with the invention applied.

Referring to the drawings in detail wherein like characters of reference denote corresponding parts, the reference character 10 indicates the scraper bar which is designed to be disposed transversely of a vehicle body or frame, in the present case, the body 11 of a tractor.

The bar 10 is provided with spaced openings for the passage of rods 12, and these rods pass through openings provided in a clamping bar 13, which is designed to be arranged transversely of the top of the tractor body 11. Clamping nuts 14 are mounted upon the upper ends of the rods 12 and provide means for securely clamping the bar 10 to the body.

In addition the invention provides braces 15. The ends of these braces are mounted upon the rods 12 beneath the bar 10, and their outer ends are provided with openings 16 for the passage of suitable bolts, by means of which the braces may be attached to the body of the tractor. These braces will act to reinforce the bar 10 and resist any tendency of the bar to pivot upon the body or to move longitudinally thereof.

The outer ends of the bar are provided with spaced grooves 17 which are designed to receive the inner ends 18 of scraper blades 19. These blades are of angular formation as shown in Figures 6 and 7 of the drawings, and their inner ends 18 are adapted to be removably and adjustably seated in the grooves 17 so as to engage the walls of the grooves and prevent lateral movement. The bar 10 is provided with openings 20 adjacent the grooves 17, for the passage of substantially L-shaped clamping bolts 21. The shanks of these bolts extend through the openings 20 and their angular ends 22 extend transversely across the inner ends 18 of the scraper blades, while nuts 23 mounted upon the bolts 21, bear against the under face of the bar 10 and serve to clamp the angular ends 22 upon the scraper blades. The blades are thus positively held in position.

The outer ends of the scraper blades are beveled as at 24 and are arranged in close relation, or in contacting engagement with the periphery of the wheels 25 of the tractor. As shown, the tractor is provided with spaced rows of cleats or traction elements, and the blades 19 are positioned between the rows to remove mud and other material which adheres to the treads of the wheels.

Figure 2:
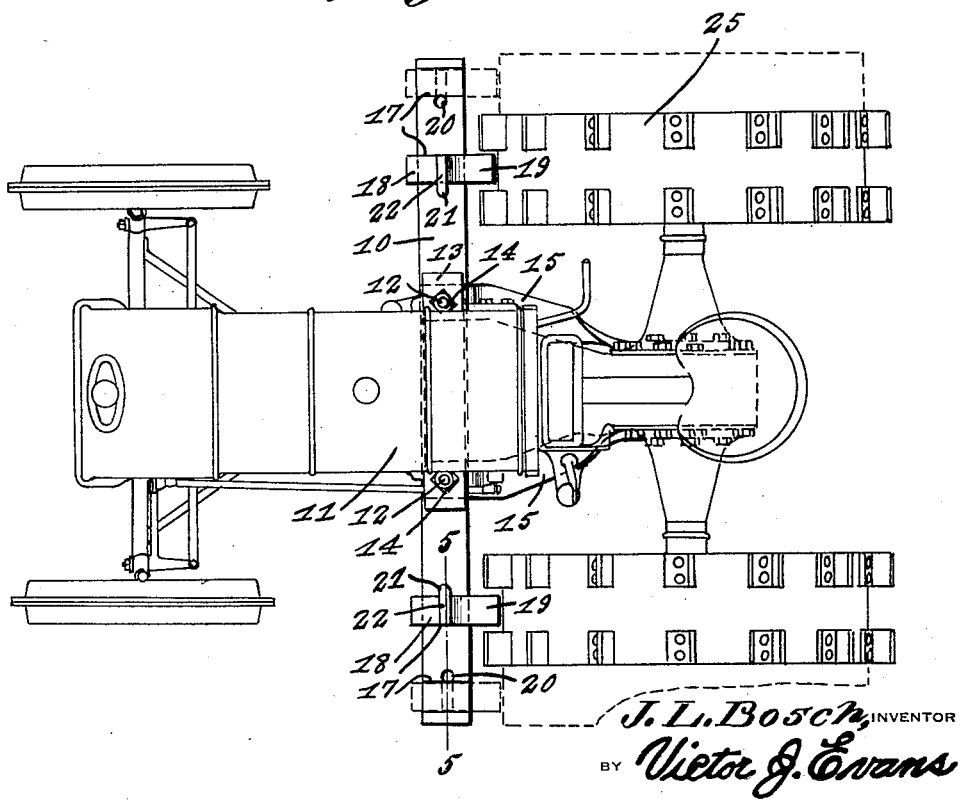
Figure 2 is a top plan view of the same.

As shown in Figure 2 of the drawings, the blades 19 are arranged centrally of the wheel treads and for this purpose are clamped within the innermost grooves 17 of the scraper bar. However, the scraper blades may be clamped in the outermost grooves 17 so as to be used with different types of wheels, or with wheels of different gages. If desired, a pair of scrapers may be arranged at each end of the bar 10 for use with wheels having a wide tread.

By reason of the manner of securing the scraper blades to the bar 10, the blades may be accurately adjusted with respect to the diameter of the wheels.

In Figure 7, the scraper blade 19a is provided with an arrow-shaped head 26 for use with wheels having relatively wide treads. This particular type of head will provide a shearing action in the removal of mud from the wheels.

The invention is susceptible of various changes in its form, proportions and minor details of construction and the right is herein reserved to make such changes as properly fall within the scope of the appended claim.

Having described the invention what is claimed is:—

The combination with a traction machine having traction wheels, of a bar disposed transversely of the machine and supported thereon in close proximity to said wheels, said bar having a series of countersunk seats at spaced intervals apart, scraper members for the wheels and selectively engaged in certain of the seats, and bolt members engaged in the bar next to the seats and having angle heads overlying said scraper members when engaged in the seats to retain the same removably secure upon the bar.

In testimony whereof I affix my signature.

JOSEPH L. BOSCH.